(12) United States Patent
Morita

(10) Patent No.: US 8,249,045 B2
(45) Date of Patent: Aug. 21, 2012

(54) COMMUNICATION CONTROL APPARATUS AND METHOD

(75) Inventor: Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/443,445

(22) PCT Filed: Sep. 27, 2007

(86) PCT No.: PCT/JP2007/068875
§ 371 (c)(1),
(2), (4) Date: Dec. 17, 2009

(87) PCT Pub. No.: WO2008/038736
PCT Pub. Date: Apr. 3, 2008

(65) Prior Publication Data
US 2010/0165858 A1    Jul. 1, 2010

(30) Foreign Application Priority Data

Sep. 28, 2006   (JP) .................................. 2006-265089

(51) Int. Cl.
*H04J 1/00* (2006.01)

(52) U.S. Cl. ........ 370/343; 370/229; 370/253; 370/237; 370/252; 709/235

(58) Field of Classification Search .................... None
See application file for complete search history.

(56) References Cited

U.S. PATENT DOCUMENTS

| 6,178,448 | B1 * | 1/2001 | Gray et al. ..................... 709/224 |
| 2002/0156910 | A1 * | 10/2002 | Senda ........................... 709/232 |
| 2005/0185621 | A1 * | 8/2005 | Sivakumar et al. ........... 370/335 |
| 2006/0133430 | A1 * | 6/2006 | Nagesh et al. ................ 370/536 |

OTHER PUBLICATIONS

Chinese language office action dated Mar. 16, 2011 and its English language translation for corresponding Chinese application 200780036327.2.

* cited by examiner

*Primary Examiner* — Jason Mattis
*Assistant Examiner* — James P Duffy
(74) *Attorney, Agent, or Firm* — DLA Piper LLP (US)

(57) ABSTRACT

When it is judged that the size of a band of a wireless IP network (10A) is insufficient for transferring IP packets within a predetermined period of time, a band calculating unit (107C) calculates a band of a wireless IP network (10B) that enables transmission of remaining IP packets excluding those transmittable via the wireless IP network (10A). Based on a judgment on whether or not an IP packet is dwelling in the wireless IP network (10B) based on a displacement of the sequence number of the IP packet calculated by a displacement calculating unit (107D), a transmission band of the wireless IP network (10B) is determined.

8 Claims, 13 Drawing Sheets

FIG. 5

(a) | DATALINK LAYER HEADER | CARE-OF ADDRESS | ESP | HOME IP ADDRESS | TCP/UDP HEADER | PAYLOAD | ESP TRAILER | ESP AUTHENTICATION DATA |

(b) | DATALINK LAYER HEADER | CARE-OF ADDRESS | TCP HEADER | CONTROL CODE |

FIG. 11
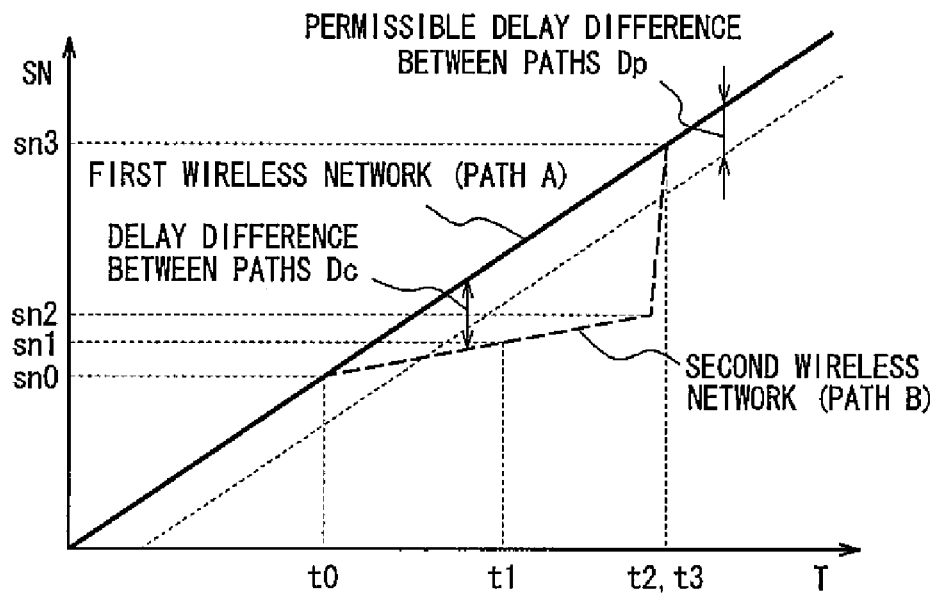
(a)
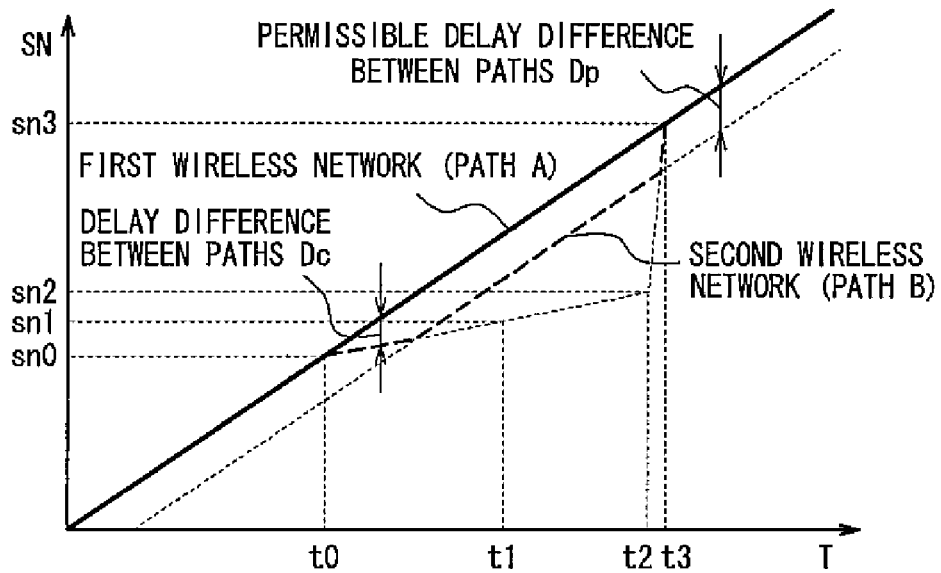
(b)

COMMUNICATION CONTROL APPARATUS AND METHOD

TECHNICAL FIELD

The present invention relates to a communication control apparatus that uses a care-of address to execute communication via a wireless IP network, and a method thereof.

BACKGROUND ART

With a wireless communication network using Internet Protocol (IP) groups (hereinafter abbreviated as a "wireless IP network" when appropriate), a so-called mobile IP is provided in order to increase the mobility of wireless communication apparatuses (for example, Non-Patent Document 1).

Mobile IP uses a care-of address dynamically assigned to a wireless communication apparatus according to the location thereof.

Non-Patent Document 1: C. Perkins, "IP Mobility Support (RFC 2002)", [online], October 1996, IETF, URL:http://www.ietf.org/rfc/rfc2002.txt (retrieved Mar. 15, 2006).

SUMMARY OF INVENTION

Technical Problem

In recent years, an environment is being provided in which a wireless communication apparatus is able to use a plurality of wireless IP networks (for example, a cellular phone network and a wireless LAN network).

However, the use of a plurality of wireless IP networks by a wireless communication apparatus according to mobile IP described above has the following problem. That is, with mobile IP, a care-of address is assigned to the wireless communication apparatus in each of the wireless IP networks. Since the wireless communication apparatus is only able to use one care-of address assigned by any one of the wireless IP networks, the plurality of wireless IP networks cannot be used "at the same time".

Consequently, a breakdown in the communication being executed occurs when the wireless communication apparatus is handed over to another wireless IP network. Furthermore, it is also difficult to use the plurality of wireless IP networks in a "seamless" manner, such as complementing an insufficient band of a wireless IP network that is being used for the communication being executed with another wireless IP network.

In consideration thereof, an object of the present invention is to provide a communication control apparatus and a method thereof in which a plurality of wireless IP networks can be used at the same time, and when a band of a wireless IP network being used by a communication being executed is insufficient, the insufficient band can be favorably complemented with another wireless IP network.

Solution to Problem

A communication control apparatus according to the present invention is capable of utilizing a plurality of different communication paths and, with respect to a requested band by an application in use having a real-time characteristic, complements an insufficient band in one communication path using another communication path, wherein the communication control apparatus includes:

a delay difference calculating unit that calculates a delay difference between a delay of an IP packet arriving via the one communication path and a delay of an IP packet arriving via the other communication path;

a band calculating unit that calculates a band in the other communication path that is a complementary path;

a displacement calculating unit that calculates a displacement of a sequence number of an IP packet in the other communication path that is the complementary path; and a transmission band determining unit that judges, based on the displacement of the sequence number of the IP packet calculated by the displacement calculating unit, whether or not the IP packet is dwelling in the complementary path, and determines a transmission band in the complementary path based on the judgment.

In a communication control apparatus according to an embodiment of the present invention, when the delay difference exceeds a permissible delay difference, the transmission band of the complementary path is set to zero.

In a communication control apparatus according to another embodiment of the present invention, when the delay difference is within a permissible delay difference, the band of the complementary path is insufficient, and dwelling of an IP packet has not occurred in the complementary path, the band of the complementary path is increased.

In a communication control apparatus according to yet another embodiment of the present invention, when the delay difference is within a permissible delay difference, the band of the complementary path is insufficient, and dwelling of an IP packet is occurring in the complementary path, the band of the complementary path is reduced.

A communication control method according to the present invention is capable of utilizing a plurality of different communication paths and, with respect to a requested band by an application in use having a real-time characteristic, complements an insufficient band in one communication path using another communication path, wherein the communication control method includes the steps of:

calculating a delay difference between a delay of an IP packet arriving via the one communication path and a delay of an IP packet arriving via the other communication path;

calculating a band in the other communication path that is a complementary path;

calculating a displacement of a sequence number of an IP packet in the other communication path that is the complementary path; and judging, based on the displacement of the sequence number of the IP packet calculated by the displacement calculating unit, whether or not the IP packet is dwelling in the complementary path, and determining a transmission band in the complementary path based on the judgment.

In a communication control method according to an embodiment of the present invention, when the delay difference exceeds a permissible delay difference, the transmission band of the complementary path is set to zero.

In a communication control method according to another embodiment of the present invention, when the delay difference is within a permissible delay difference, the band of the complementary path is insufficient, and dwelling of an IP packet has not occurred in the complementary path, the band of the complementary path is increased.

In a communication control method according to yet another embodiment of the present invention, when the delay difference is within a permissible delay difference, the band of the complementary path is insufficient, and dwelling of an IP packet is occurring in the complementary path, the band of the complementary path is reduced.

Advantageous Effects on Invention

According to the present invention, a plurality of wireless IP networks can be used at the same time, and when the band of a wireless IP network being used by a communication being executed is insufficient, the insufficient band can be favorably complemented with another wireless IP network.

BRIEF DESCRIPTION OF DRAWINGS

FIG. 5 is a configuration diagram of an IP packet according to an embodiment of the present invention;

FIG. 11(a) is a diagram showing a time variation in a sequence number of an IP packet in a first wireless network (path A) and a second wireless network (path B) in a case where communication control according to the present invention is not performed, while FIG. 11(b) is a diagram showing a time variation in a sequence number of an IP packet in the first wireless network (path A) and the second wireless network (path B) in a case where communication control according to the present invention is performed;

DESCRIPTION OF EMBODIMENTS

An embodiment of a communication control apparatus and a method thereof according to the present invention will now be described in detail with reference to the drawings.

Figure 1:
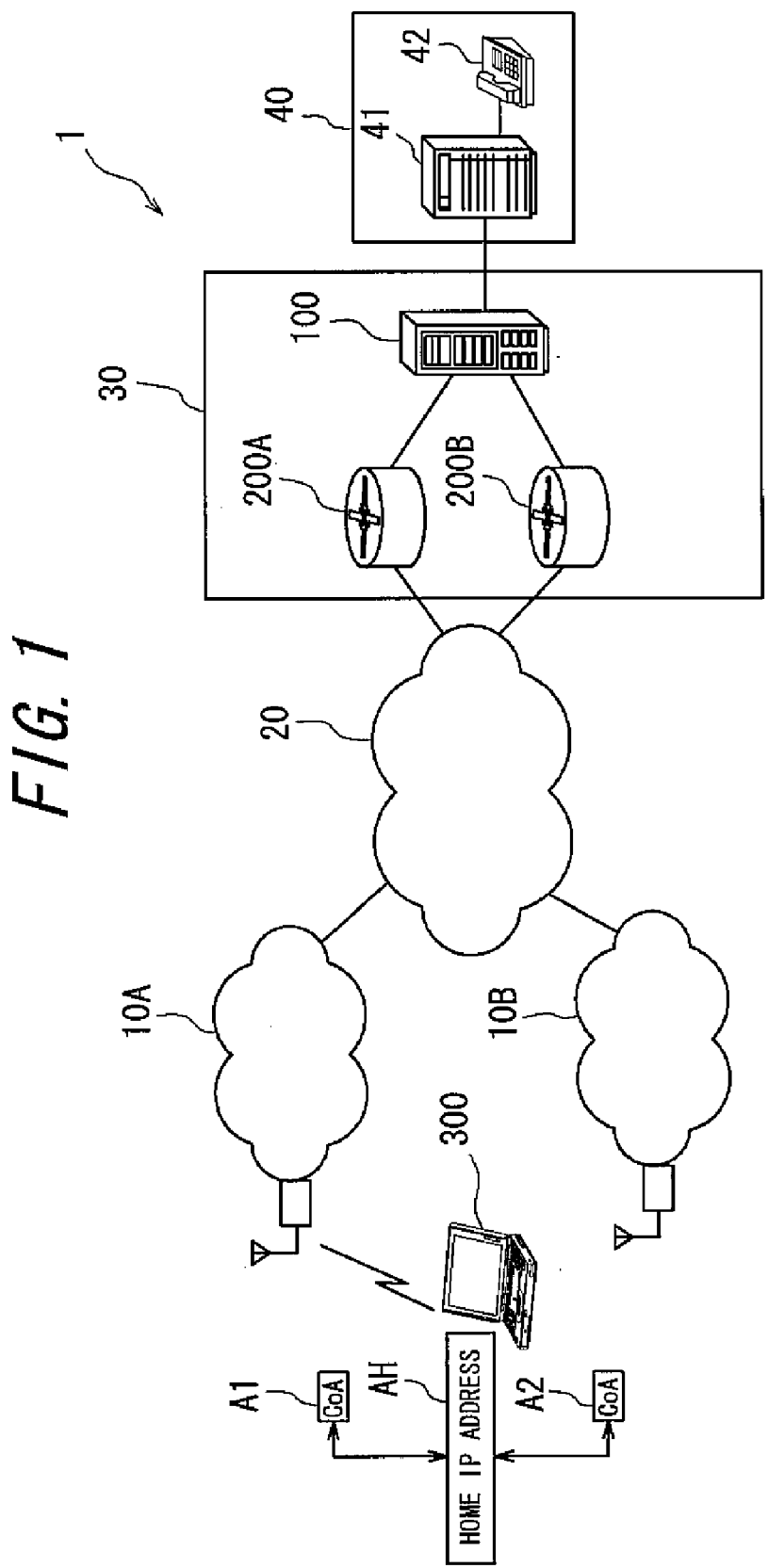
FIG. 1 is an overall schematic configuration diagram of a communication system according to an embodiment of the present invention.

FIG. 1 is an overall schematic configuration diagram of a communication system 1 according to the present embodiment. As shown in FIG. 1, the communication system 1 includes a wireless IP network 10A and a wireless IP network 10B. The wireless IP network 10A (first wireless IP network) is an IP network capable of transmitting IP packets. In the wireless IP network 10A, a care-of address A1 (first care-of address) is dynamically assigned to a wireless communication apparatus 300 (hereinafter abbreviated as MN 300) according to the position thereof. In the present embodiment, the wireless IP network 10A is a cellular phone network that uses CDMA (to be specific, HRPD, a standard of 3GPP2) as a wireless communication system.

The wireless IP network 10B (second wireless IP network) is capable of transmitting IP packets in the same manner as the wireless IP network 10A. In the wireless IP network 10B, a care-of address A2 (second care-of address) is assigned to the MN 300. In the present embodiment, the wireless IP network 10B uses mobile WiMAX that complies with the IEEE 802.16 standard as a wireless communication system.

The care-of address A1 is assigned by the wireless IP network 10A when the MN 300 connects to the wireless IP network 10A. Similarly, the care-of address A2 is assigned by the wireless IP network 10B when the MN 300 connects to the wireless IP network 10B. Furthermore, in the present embodiment, the care-of address A1 and the care-of address A2 are associated to a home IP address AH (virtual address).

A switching server 100 and the MN 300 are capable of executing communication by simultaneously using the wireless IP network 10A and the wireless IP network 10B. Specifically, when a band (transfer rate) of the wireless IP network 10A used for transmitting/receiving IP packets is insufficient, the switching server 100 and the MN 300 complement the insufficient band using the wireless IP network 10B. The wireless IP network 10A and the wireless IP network 10B are connected to the Internet 20. A relay center 30 is also connected to the Internet 20.

A network device that relays IP packets transmitted/received by the MN 300 is installed in the relay center 30. Specifically, the switching server 100 and VPN routers 200A, 200B are installed in the relay center 30.

The switching server 100 controls a communication path to the MN 300. In the present embodiment, the switching server 100 constitutes a communication control apparatus. Specifically, the switching server 100 is capable of transmitting IP packets to the MN 300 via the wireless IP network 10A or the wireless IP network 10B.

The VPN routers 200A and 200B execute IP packet routing. In addition, the VPN routers 200A and 200B establish a VPN (IPSec) tunnel between the MN 300 and the switching server 100. By establishing the tunnel, virtualization of OSI Layer 3 is realized and the IP mobility of the MN 300 is secured.

In other words, in the present embodiment, unlike mobile IP (such as RFC 2002), the MN 300 is capable of executing communication with a to communication destination (to be specific, an IP phone terminal 42) while simultaneously using both a communication path configured via the wireless IP network 10A and a communication path configured via the wireless IP network 10B.

The relay center 30 (the switching server 100) is connected to a user premise 40 via a prescribed communication network (not shown). An IP phone switch 41 and the IP phone terminal 42 are installed in the user premise 40. The IP phone switch 41 relays IP packets (to be specific, VoIP packets) between the prescribed communication network and the IP phone terminal 42. The IP phone terminal 42 interconverts speech signals and VoIP packets, and transmits/receives IP packets. In other words, in the present embodiment, the MN 300 executes communication with the IP phone terminal 42 (communication destination) via the switching server 100.

Next, a functional block configuration of the communication system 1 will be described. Specifically, a description will be given on functional block configurations of the switching server 100 and the MN 300 included in the communication system 1. Hereinafter, portions relevant to the present invention will mainly be described. As such, the switching server 100 and the MN 300 may be provided with logical blocks (a power supply unit and the like) essential in realizing the functions of the present apparatus but are neither shown nor described.

Figure 2:
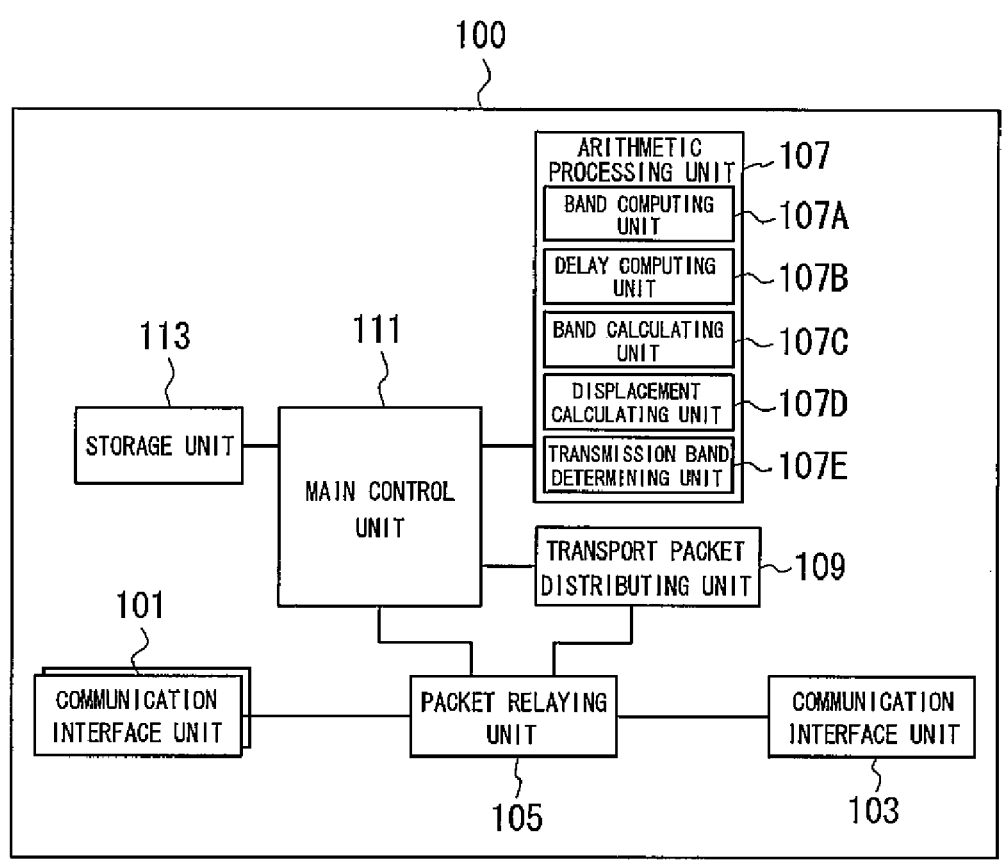
FIG. 2 is a functional block configuration diagram of a communication control apparatus according to an embodiment of the present invention.

FIG. 2 is a functional block configuration diagram of the switching server 100. As shown in FIG. 2, the switching server 100 includes: a communication interface unit 101; a communication interface unit 103; a packet relaying unit 105; an arithmetic processing unit 107; a transport packet distributing unit 109; a main control unit 111; and a storage unit 113.

The communication interface unit 101 is connected to the VPN router 200A and the VPN router 200B. The communication interface unit 101 can be configured by, for example, 1000 BASE-T regulated according to IEEE 802.3ab.

In addition, as described above, since a VPN using IPSec is set in the present embodiment, an IP packet transmitted/received by the communication interface unit 101 or, to be specific, a VoIP packet transmitted/received between the switching server 100 and the MN 300 (specifically, a VoIP packet transmitted by the MN 300) is configured as shown in FIG. 5(*a*). As shown in FIG. 5(*a*), a home IP header (home IP address AH), a TCP/UDP header and a payload are encapsulated, and a care-of address (the care-of address A1 or the care-of address A2) is added.

Moreover, an access control packet transmitted/received between the switching server 100 and the MN 300 is configured as shown in FIG. 5(*b*). The access control packet is made up of a datalink layer header, a care-of address, a TCP header, and a control code. Details of the control code will be provided later.

The communication interface unit 103 is used for executing communication with the IP phone switch 41 and the IP phone terminal 42. The packet relaying unit 105 relays IP packets transmitted/received by the communication interface unit 101 and the communication interface unit 103. To be specific, the packet relaying unit 105 relays IP packets according to instructions from the transport packet distributing unit 109 or the main control unit 111. In addition, the packet relaying unit 105 includes a jitter buffer that absorbs jitters of IP packets received by the communication interface unit 101 and the communication interface unit 103.

In the present embodiment, the packet relaying unit 105 constitutes a relaying unit that receives IP packets (VoIP packets) transmitted at a predetermined period (20 ms) from the MN 300 to the IP phone terminal 42 via the wireless IP network 10A and relays the IP packets (VoIP packets) to the IP phone terminal 42.

The arithmetic processing unit 107 includes: a band computing unit 107A; a delay computing unit 107B; a band calculating unit 107C; a displacement calculating unit 107D; and a transmission band determining unit 107E. The band computing unit 107A computes bands (transfer rates) of the wireless IP network 10A and the wireless IP network 10B necessary for receiving IP packets from the MN 300. In addition, the band computing unit 107A computes bands of the wireless IP network 10A and the wireless IP network 10B necessary for transmitting VoIP packets to be transmitted from the IP phone terminal 42 to the MN 300. Moreover, the band computing unit 107A is capable of computing necessary bands in accordance with the type of the speech encoding rule (CODEC) or encoding rate.

The delay computing unit 107B calculates a delay difference between the delay of an IP packet arriving via the wireless IP network 10A and the delay of an IP packet arriving via the wireless IP network 10B. When it is judged that the size of the band of the wireless IP network 10A is insufficient for transferring IP packets within a predetermined period of time, the band calculating unit 107C calculates a band of the wireless IP network 10B that enables transmission of remaining IP packets excluding those transmittable via the wireless IP network 10A using the band of the wireless IP network 10A within a second half timeframe that follows a first half timeframe. The displacement calculating unit 107D calculates a displacement of a sequence number of an IP packet arrived via the wireless IP network 10B. Based on the displacement of the sequence number of the IP packet calculated by the displacement calculating unit 107D, the transmission band determining unit 107E judges whether or not the IP packet is dwelling in the wireless IP network 10B and determines a transmission band of the wireless IP network 10B based on the judgment.

The transport packet distributing unit 109 executes processing for distributing IP packets transmitted from the communication interface unit 101 via the packet relaying unit 105 to the wireless IP network 10A or the wireless IP network 10B.

To be specific, based on a complementary band quantity notification message (first downbound transmission control information) received by the main control unit 111 from the MN 300, the transport packet distributing unit 109 adds the care-of address A1 to an IP packet received from the IP phone terminal 42 and which contains the home IP address AH. The care-of address A1-added IP packet is transmitted from the communication interface unit 101 to the wireless IP network 10A.

In addition, based on a complementary band quantity notification message (second downbound transmission control information) received by the main control unit 111 from the MN 300, the transport packet distributing unit 109 adds the care-of address A2 to an IP packet received from the IP phone terminal 42 and which contains the home IP address AH. The care-of address A2-added IP packet is transmitted from the communication interface unit 101 to the wireless IP network 10B. In the present embodiment, the transport packet distributing unit 109 constitutes a first downbound transmitting unit and a second downbound transmitting unit.

The main control unit 111 controls communication paths of IP packets transmitted to and received from the MN 300. In addition, the main control unit 111 executes processing of access control packets. Particularly, in the present embodiment, the main control unit 111 judges whether or not the size of the band of the wireless IP network 10A used for receiving VoIP packets from the MN 300 is sufficient for transferring VoIP packets within a window T1 (a predetermined period of time). To be specific, the main control unit 111 judges whether or not the size of the band of the wireless IP network 10A is sufficient based on the number of VoIP packets received by the packet relaying unit 105 from the MN 300 within a window T2 (the number of packets already received). In the present embodiment, the band computing unit 107A and the main control unit 111 constitute a band judging unit.

Figure 6:
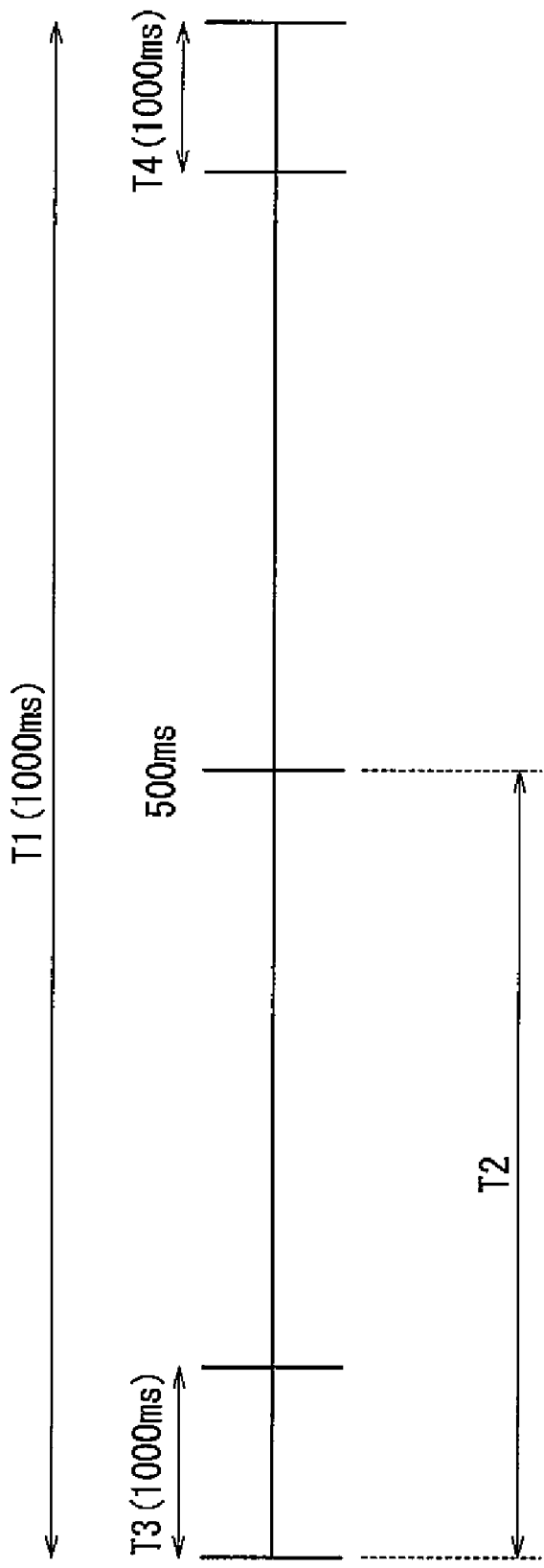
FIG. 6 is a configuration diagram of a window used in judging a complementary band according to an embodiment of the present invention.

Furthermore, the main control unit 111 is capable of varying the size of the window T2 (first half timeframe) based on the number of VoIP packets received from the MN 300 within the window T2 or, in other words, the number of packets already received. As shown in FIG. 6, the default value of the window T2 is 500 ms.

Specifically, the main control unit 111 is capable of expanding the size of the window T2 when the number of VoIP packets obtained by subtracting the number of VoIP packets (for example, 100 ms/20 ms=5) to be received within a window T3 or a window T4 (100 ms) from the number of VoIP packets (for example, 500 ms/20 ms=25) to be received within the window T2 (500 ms) is smaller than the number of packets already received.

In this case, the window T3 or the window T4 (sub timeframe) is set equal to or below the size of the window T2. Moreover, in the present embodiment, the window T3 or the window T4 is set to 100 ms and is consistent with the size of the jitter buffer provided in the packet relaying unit 105.

Furthermore, the main control unit 111 is capable of reducing the size of the window T2 when the number of VoIP packets obtained by subtracting the number of VoIP packets to be received within the window T3 or the window T4 from the number of VoIP packets to be received within the window T2 is greater than the number of packets already received. Specific methods for varying the size of the window T2 will be described later.

Moreover, when judging that the size of the band of the wireless IP network 10A used for receiving VoIP packets from the MN 300 is insufficient for transferring the VoIP packets within a predetermined period of time, the main control unit 111 operates as follows. That is, the main control unit 111 is capable of transmitting to the MN 300 a complementary band quantity notification message (first upbound transmission control information) that causes the wireless IP network 10A to transmit the number of VoIP packets transmittable using the band within a timeframe (second half timeframe) subsequent to the window T2 or, to be specific, within the window T1-window T2 shown in FIG. 6.

Furthermore, the main control unit 111 is also capable of transmitting to the MN 300 a complementary band quantity notification message (second upbound transmission control information) that causes the wireless IP network 10B to transmit the remaining VoIP packets excluding those transmittable within the window T1-window T2. In the present embodiment, the band computing unit 107A and the main control unit 111 constitute a first upbound transmission control unit and a second upbound transmission control unit.

In addition, the main control unit 111 is also capable of receiving from the MN 300 a complementary band quantity notification message (the first downbound transmission control information) that causes the wireless IP network 10A to transmit the number of VoIP packets transmittable within the window T1-window T2. Furthermore, the main control unit 111 is also capable of receiving from the MN 300 a complementary band quantity notification message (second downbound transmission control information) that causes the wireless IP network 10B to transmit the remaining VoIP packets excluding those transmittable within the window T1-window T2. In the present embodiment, the communication interface unit 101 and the main control unit 111 constitute a control information receiving unit.

The complementary band quantity notification messages are transmitted/received using access control packets (refer to FIG. 5(b)). Table 1 shows an example of contents of an access control packet transmitted from the MN 300 to the switching server 100. In addition, Table 2 shows an example of contents of an access control packet transmitted from the switching server 100 to the MN 300.

TABLE 1

Access control packet (MN 300 → switching server 100)

| Type | Control code | Name | Processing contents |
|---|---|---|---|
| Communication interface change | 0x11 | Interface switch request | Switch to reply interface having received the present message, and continue communication by switch source until further instructions. Respond to MN at control code 0x12. |
| Complementary band quantity notification 1 | 0x22 | Band complementation quantity notification message 1 | Notify complementary band quantity to switching server |
| Complementary band quantity notification 2 | 0x26 | Band complementation quantity notification message 2 | Notify that the switching server must execute band complementation processing including retransmission |
| Reply request | 0x31 | Copy reply request | Return receiving payload as-is at control code 0x32. |
| Response | 0x2C | Band complementation quantity notification response | Respond to band complementation quantity notification using control code 0x28. |

TABLE 2

Access control packet (Switching server 100 → MN 300)

| Type | Control code | Name | Processing contents |
|---|---|---|---|
| Response | 0x12 | Interface change response | Response to control code 0x11 |
| | 0x24 | Band complementation quantity notification response | Response to control code 0x22 |
| | 0x32 | Copy response | Response to control code 0x31 |

TABLE 2-continued

Access control packet (Switching server 100 → MN 300)

| Type | Control code | Name | Processing contents |
|---|---|---|---|
| Complementary band quantity notification 1 | 0x28 | Band complementation quantity notification message 1 | Notify complementary band quantity to MN |
| Complementary band quantity notification 2 | 0x2A | Band complementation quantity notification message 2 | Notify that the MN must execute band complementation processing including retransmission |

The control codes are described using the first byte of the payload portion (refer to FIG. 5(b)) of the access control packet. In addition, the home IP address AH of the MN 300 may be included following the control code. When receiving an access control packet whose contents are as shown in Table 1 from the MN 300, the switching server 100 transmits an access control packet (response packet) shown in Table 2 to the MN 300. The payload portion of an access control packet received from the MN 300 is copied onto an access control packet transmitted from the switching server 100.

Furthermore, the main control unit 111 checks the sequence of IP packets received via the wireless IP network 10A and the wireless IP network 10B. In the present embodiment, the main control unit 111 checks an RTP (real-time transport protocol) sequence number included in a VoIP packet transmitted/received between the MN 300 and the IP phone terminal 42. Moreover, the main control unit 111 is capable of acquiring statistical information of IP packets relayed by the packet relaying unit 105 (for example, packet loss, throughput, underrun counts and overrun counts of jitter buffer) and transmitting the acquired information to the MN 300.

The storage unit 113 stores an application program providing functions of the switching server 100, and the like. In addition, the storage unit 113 stores information regarding networks such as the wireless IP network 10A and the wireless IP network 10B.

Particularly, in the present embodiment, the storage unit 113 stores the home IP address AH of the MN 300 associated to the care-of address A1 and the care-of address A2. Specifically, the main control unit 111 causes the storage unit 113 to store the care-of address A1, the care-of address A2 and the home IP address AH notified from the MN 300. In the present embodiment, the main control unit 111 and the storage unit 113 constitute a virtual address acquiring unit.

Moreover, the main control unit 111 is capable of collating the home IP address AH included in the IP packet transmitted from the IP phone terminal 42 with an home IP address registered in a home agent (not shown) accessible via the Internet 20. By performing the collation, the main control unit 111 is capable of judging which communication carrier had assigned the home IP address AH to the MN 300.

Figure 3:
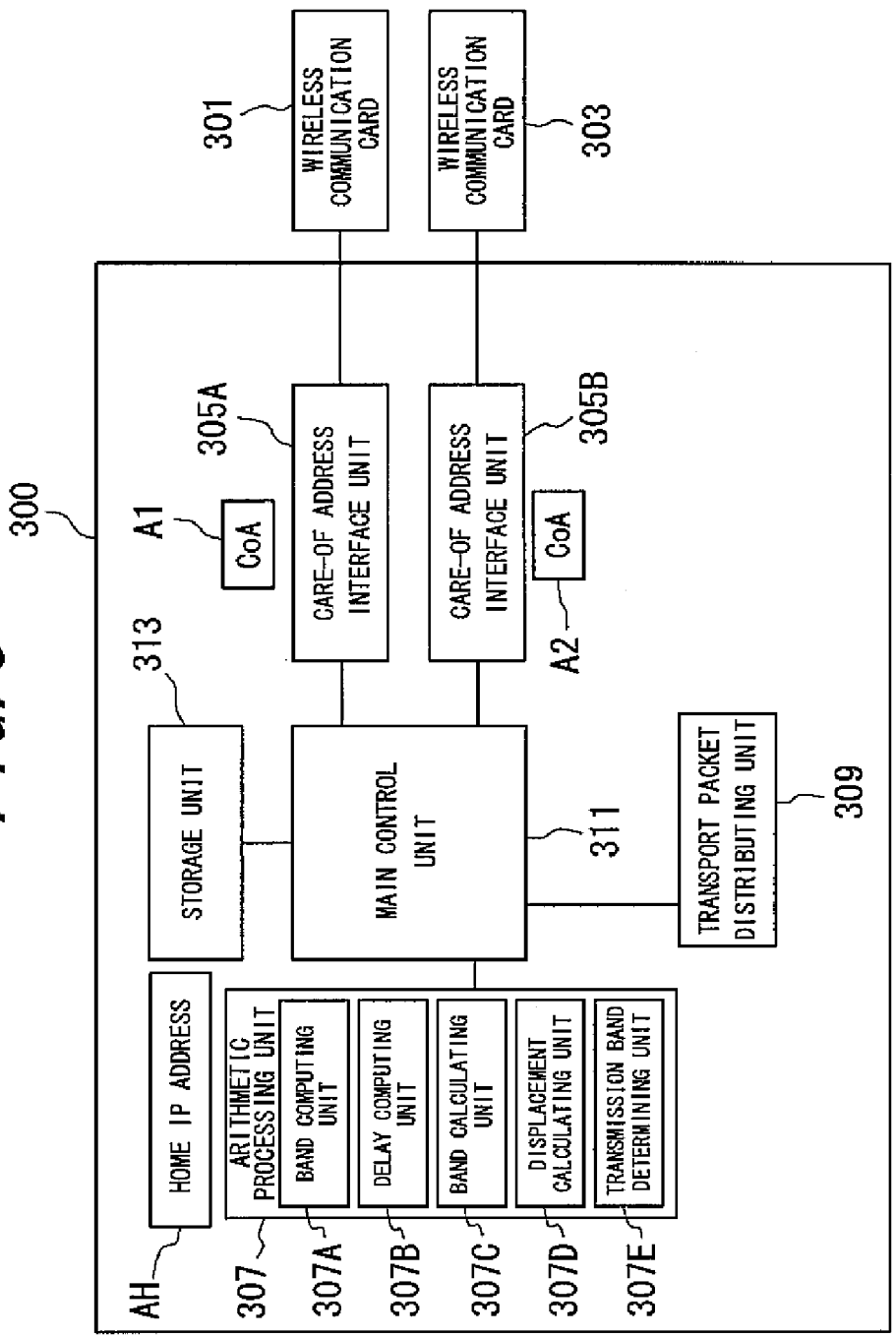
FIG. 3 is a functional block configuration diagram of a wireless communication apparatus according to an embodiment of the present invention.

FIG. 3 is a functional block configuration diagram of the MN 300. In the same manner as the switching server 100, the MN 300 is capable of executing communication by simultaneously using the wireless IP network 10A and the wireless IP network 10B. Hereinafter, descriptions on function blocks similar to those of the aforementioned switching server 100 will be omitted when appropriate.

As shown in FIG. 3, the MN 300 includes: a wireless communication card 301; a wireless communication card 303; a care-of address interface unit 305A; a care-of address interface unit 305B; an arithmetic processing unit 307; a transport packet distributing unit 309; a main control unit 311; and a storage unit 313.

The wireless communication card 301 executes wireless communication according to the wireless communication system (HRPD, a standard of 3GPP2) used by the wireless IP network 10A. In the present embodiment, the wireless communication card 301 constitutes a receiving unit that receives IP packets (VoIP packets) transmitted at a prescribed period (for example, 20 ms) from the IP phone terminal 42 via the wireless IP network 10A.

The wireless communication card 303 executes wireless communication compliant with the wireless communication system (mobile WiMAX) used by the wireless IP network 10B. The care-of address interface unit 305A is connected to the wireless communication card 301. The care-of address interface unit 305A transmits/receives IP packets based on the care-of address A1 assigned to the MN 300 in the wireless IP network 10A. The care-of address interface unit 305B is connected to the wireless communication card 303. The care-of address interface unit 305B transmits/receives IP packets based on the care-of address A2 assigned to the MN 300 in the wireless IP network 10B.

The arithmetic processing unit 307 includes: a band computing unit 307A; a delay computing unit 307B; a band calculating unit 307C; a displacement calculating unit 307D; and a transmission band determining unit 307E. The band computing unit 307A computes bands (transfer rates) of the wireless IP network 10A and the wireless IP network 10B necessary for receiving IP packets from the switching server 100. The delay computing unit 307B calculates a delay difference between the delay of an IP packet arriving via the wireless IP network 10A and the delay of an IP packet arriving via the wireless IP network 10B. When it is judged that the size of the band of the wireless IP network 10A is insufficient for transferring IP packets within a predetermined period of time, the band calculating unit 307C calculates a band of the wireless IP network 10B that enables transmission of remaining IP packets excluding those transmittable using the band of the wireless IP network 10A via the wireless IP network 10A within a second half timeframe following a first half timeframe. The displacement calculating unit 307D calculates a displacement of a sequence number of an IP packet arrived via the wireless IP network 10B. Based on the displacement of the sequence number of the IP packet calculated by the displacement calculating unit 307D, the transmission band determining unit 307E judges whether or not the IP packet is dwelling in the wireless IP network 10B and determines a transmission band of the wireless IP network 10B based on the judgment.

Specific functions of the band computing unit 307A, the delay computing unit 307B, the band calculating unit 307C, the displacement calculating unit 307D, and the transmission band determining unit 307E are approximately the same as those of the band computing unit 107A, the delay computing unit 107B, the band calculating unit 107C, the displacement calculating unit 107D, and the transmission band determining unit 107E described above.

The transport packet distributing unit 309 generates an IP packet including the home IP address AH and the care-of address A1 based on a complementary band quantity notification message (first upbound transmission control information) received by the main control unit 311 from the switching server 100. The generated IP packet is transmitted from the main control unit 311 to the wireless IP network 10A via the care-of address interface unit 305A and the wireless communication card 301. In the present embodiment, the transport packet distributing unit 309 constitutes a first upbound transmitting unit.

In addition, the transport packet distributing unit 309 generates an IP packet including the home IP address AH and the care-of address A2 based on a complementary band quantity notification message (second upbound transmission control information) received by the main control unit 311 from the switching server 100. The generated IP packet is transmitted from the main control unit 311 to the wireless IP network 10B via the care-of address interface unit 305B and the wireless communication card 303. In the present embodiment, the transport packet distributing unit 309 constitutes a second upbound transmitting unit.

In the same manner as the main control unit 111 (refer to FIG. 2) of the switching server 100, the main control unit 311 controls communication paths of IP packets transmitted to and received from the switching server 100. In addition, the main control unit 311 executes processing of access control packets.

The main control unit 311 judges whether the size of the band of the wireless IP network 10A used for receiving IP packets (to be specific, VoIP packets) from the switching server 100 is sufficient or not for transferring the VoIP packets within the window T1 (a predetermined period of time) based on the amount of VoIP packets already received by the wireless communication card 301 from the switching server 100 within the window T2. In the present embodiment, the band computing unit 307A and the main control unit 311 constitute a band judging unit.

In addition, when the main control unit 311 judges that the size of the band of the wireless IP network 10A is insufficient for transferring the VoIP packets within a predetermined period of time, the main control unit 311 adds the care-of address A1 to the number of VoIP packets transmittable using the band within the window T1-window T2 (refer to FIG. 6), and transmits to the switching server 100 a complementary band quantity notification message (first downbound transmission control information) that causes the wireless IP network 10A to transmit the care-of address A1-added VoIP packets.

Furthermore, the main control unit 311 adds the care-of address A2 to the remaining VoIP packets excluding the care-of address A1-added VoIP packets, and transmits to the switching server 100 a complementary band quantity notification message (second downbound transmission control information) that causes the wireless IP network 10B to transmit the care-of address A2-added VoIP packets. In the present embodiment, the band computing unit 307 and the main control unit 311 constitute a first downbound transmission control unit and a second downbound transmission control unit.

Moreover, the main control unit 311 is also capable of receiving a complementary band quantity notification message (first upbound transmission control information) that causes the wireless IP network 10A to transmit the number of VoIP packets transmittable within the window T1-window T2. In addition, the main control unit 311 is also capable of receiving a complementary band quantity notification message (second upbound transmission control information) that causes the wireless IP network 10B to transmit the remaining VoIP packets excluding those transmittable within the window T1-window T2.

In the present embodiment, the wireless communication card 301 and the main control unit 311 constitute a control information receiving unit. In addition, the main control unit 311 is capable of varying (enlarging or reducing) the size of the window T2 in the same manner as the main control unit 111 of the switching server 100. Furthermore, the main control unit 311 is also capable of acquiring information indicating the quality of wireless communication executed by the wireless communication card 301 and the wireless communication card 303 (such as throughput, SINR, RSSI, DRC, and transmission power), and predicting bands (downbound and upbound) of the wireless IP network 10A and the wireless IP network 10B based on the acquired information.

The storage unit 313 stores an application program providing functions of the MN 300, and the like. In addition, the storage unit 313 stores the home IP address AH of the MN 300 associated to the care-of address A1 and the care-of address A2. In the present embodiment, the storage unit 313 constitutes a virtual address storage unit.

Next, operations of the aforementioned communication system will be described. To be specific, descriptions will be given on: (1) Transmission/reception of IP packets (VoIP) packets between the switching server 100 and the MN 300; (2) Judgment of necessity of band complementation by the wireless IP network 10B; (3) Distribution of IP packets (VoIP packets) to the wireless IP network 10A and the wireless IP network 10B; and (4) Variation of judgment time (window T2) on band complementation.

(1) Transmission/Reception of IP Packets Between the Switching Server 100 and the MN 300

Figure 4:
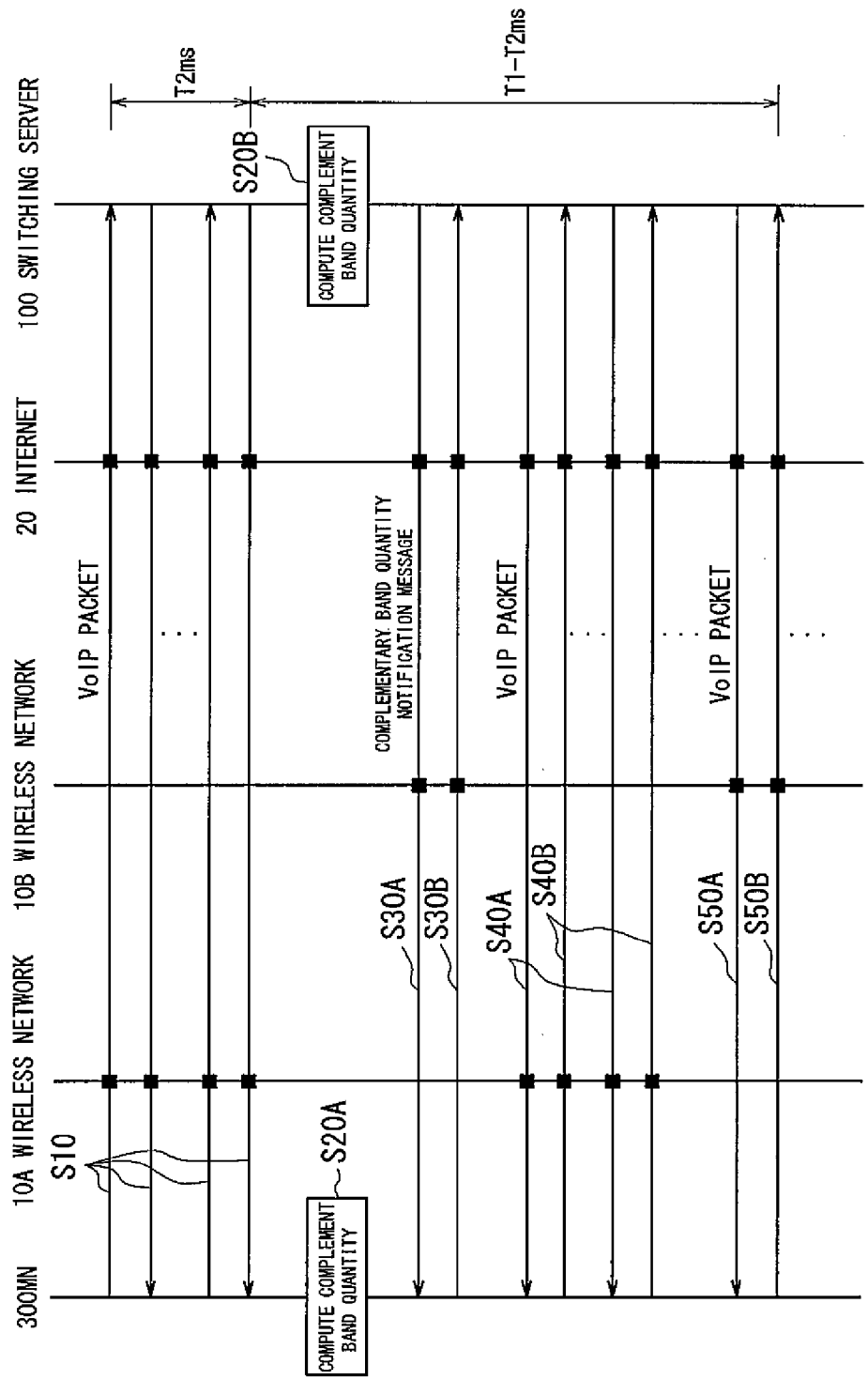
FIG. 4 is a sequence diagram of communication executed between a communication control apparatus and a wireless communication apparatus according to an embodiment of the present invention.

FIG. 4 is a sequence diagram of communication executed between the switching server 100 and the MN 300. As shown in FIG. 4, in step S10, the switching server 100 and the MN 300 transmit/receive VoIP packets. The VoIP packets are transmitted/received in association with verbal communication between the MN 300 and the IP phone terminal 42 (refer to FIG. 1).

Specifically, the MN 300 transmits an IP packet (refer to FIG. 5(*a*)) an IP packet in which a payload including an IP address assigned to the IP phone terminal 42 and the home IP address AH are capsulated and whose transmission source address is the care-of address A1. In addition, the switching server 100 transmits an IP packet in which a VoIP packet transmitted from the IP phone terminal 42 is capsulated and whose destination address is the care-of address A1. In the diagram, the ■ symbols mark networks that the VoIP packets pass through (ditto hereinafter). In step S10, all VoIP packets pass through the wireless IP network 10A and the wireless IP network 10B.

In step S20A, the MN 300 computes a "downbound" band quantity to be complemented using the wireless IP network 10B. Additionally, in step S20B, the switching server 100 computes an "upbound" band quantity to be complemented using the wireless IP network 10B. In steps S20A and S20B, the band quantities to be complemented are computed based on the number of VoIP packets received within the window T2 (refer to FIG. 6) (the number of VoIP packets already received). A specific method for computing the band quantity to be complemented will be described later.

In step S30A, based on the computation result of the "upbound" band quantity to be complemented, the switching server 100 transmits a complementary band quantity notification message (first upbound transmission control information and second upbound transmission control information) to the MN 300.

In step S30B, based on the computation result of the "downbound" band quantity to be complemented, the MN 300 transmits a complementary band quantity notification message (first downbound transmission control information and second downbound transmission control information) to the switching server 100.

In step S40A, based on the complementary band quantity notification message (first downbound transmission control information) received from the MN 300, the switching server 100 transmits to the wireless IP network 10A the number of VoIP packets transmittable within the window T1-window T2 (refer to FIG. 6).

In step S40B, based on the complementary band quantity notification message (first upbound transmission control information) received from the switching server 100, the MN 300 transmits to the wireless IP network 10A the number of VoIP packets transmittable within the window T1-window T2.

In step S50A, based on the complementary band quantity notification message (second downbound transmission control information) received from the MN 300, the switching server 100 transmits to the wireless IP network 10B the remainder of VoIP packets excluding the number of VoIP packets transmittable within the window T1-window T2.

In step S50B, based on the complementary band quantity notification message (second upbound transmission control information) received from the switching server 100, the MN 300 transmits to the wireless IP network 10B the remainder of VoIP packets excluding the number of VoIP packets transmittable within the window T1-window T2.

In steps S50A and S50B, the VoIP packets pass through the wireless IP network 10B and the Internet 20 (refer to the ■ symbols in the diagram). In other words, a band required for transmitting the remaining VoIP packets excluding the number of VoIP packets transmittable within the window T1-window T2 is complemented by the wireless IP network 10B.

(2) Judgment of Necessity of Band Complementation by the Wireless IP Network 10B

As described above, the switching server 100 and the MN 300 judge the necessity of band complementation using the windows shown in FIG. 6. As shown in FIG. 6, in the present embodiment, the window T1 is set to 1,000 ms. The default value of the window T2 (first half timeframe) is set to 500 ms or half the size of the window T1. That is, the default value of window T1-window T2 (second half timeframe) is also set to 500 ms.

Hereinafter, a judgment of necessity by the switching server 100 will be described as an example. A similar judgment of necessity is to be executed by the MN 300.

(a) The switching server 100 counts the VoIP packets received from the MN 300 within the window T2. The window T2 is used as a threshold for judging the necessity of band complementation and for computing a band to be complemented by the wireless IP network 10B. The size of the window T2 is adaptively varied as will be described later.

(b) A permissible jitter buffer time is denoted by tjit (for example, 100 ms). A frame length of a real-time application to be used (in the present embodiment, VoIP) is denoted by Tf (20 ms). In addition, the number of VoIP packets received within the window T2 is denoted by Ct.

(c) Since T2/Tf (500/20=25) number of VoIP packets can be received within the window T2, the reception of Ct (for example, 21) number of VoIP packets by the end of window T2 indicates that VoIP packet transfer is delayed by (T2/Tf−Ct).

(d) Since the MN 300 has already transmitted T2/Tf (for example, 25) number of VoIP packets within the window T2 or 500 ms, when the switching server 100 has received Ct (for example, 21) number of VoIP packets by the end of the window T2, the switching server 100 judges whether the delayed packets (for example, 4) can be received or not within the window T1-window T2 according to Formula (1).

$$\text{If } ((T1-T2)/T2 * Ct) \geq T2/Tf - Ct \quad (1)$$

Then VoIP packet retransmission is judged unnecessary and complementary band is computed Else VoIP packet retransmission is judged necessary and complementary band is computed (e) When it is judged that VoIP packet retransmission is unnecessary, since VoIP packets are delayed by (T2/Tf-Ct) in window T2, it is predicted that (T2/Tf−Ct)*T1/T2 number of VoIP packets are to be delayed within the window T1-window T2. Since Ct (for example, 21) number of VoIP packets have been received via the wireless IP network 10A within the window T2, Ct*T1/T2 (decimals truncated) number of VoIP packets can conceivably be received within the window T1. Therefore, the number of VoIP packets not transmittable via the wireless IP network 10A within the window T1 is T1/Tf−Ct*T1/T2 (decimals truncated). The number of VoIP packets calculated using this formula becomes the band to be complemented using the wireless IP network 10B. The switching server 100 transmits a complementary band quantity notification message (to be specific, the complementary band quantity notification message 1 shown in Table 2) including information indicating the calculated band (for example, the number of VoIP packets) to the MN 300.

(f) When it is expected that all of the VoIP packets to be transmitted are transmittable within the window T1, the size of the window T2 can be expanded to improve the calculation accuracy of the complementary band. In addition, the size of the window T2 is reduced when the band of the wireless IP network 10A currently used to transmit/receive VoIP packets decreases significantly. That is, unless the size of the window T2 is reduced, the timing at which the switching server 100 computes a complementary band will be too late, resulting in a case where an appropriate number of VoIP packets cannot be transmitted to the wireless IP network 10B.

(g) The variable range of the window T2 is assumed to be window T3~(window T1−window T4) or, specifically, 100 ms~900 ms. In addition, in the present embodiment, it is set that window T3=window T4=tjit. The switching server 100 uses the jitter buffer time tjit as a sub window (sub timeframe). In addition, the switching server 100 uses the number of VoIP to be received within the sub window as a threshold and varies the size of the window T2 with the sub window size as a unit.

In the present embodiment, the size (time) of the sub window is assumed to be the size of the jitter buffer. Accordingly, even when an error is observed between the complementary band computation result and the actual band (transfer rate), such an error can be absorbed by the jitter buffer. An example of size variation of the window T2 will be described later.

(h) To be specific, the switching server 100 varies the size of the window T2 according to the following series of formulas (flow).

$$k=1$$

If $T2/Tf-(k*tjit/Tf)<Ct$ (2)

If $T2=T1-T4$

Then T2=T2 (T2 is upper limit and therefore not varied)

Stop

Else $T2=T2+tjit$ (e.g., T2+100 ms) (3)

Stop

Else If $T2/Tf-(k+1)*(tjit/Tf)<Ct<T2/Tf-(k*tjit/Tf)$ (4)

If T2=T3

Then T2=T2 (T2 is lower limit and therefore not varied)

Stop

Else $T2=T2+k*tjit$ (e.g., k*100 ms) (5)

Stop

Else $k=k+1$ (6)

If $k=T2/tjit-1(T2/Tf-(k+1)*tjit/Tf)=0$

Then Stop (complement all bands with wireless IP network 10B)

Else Go to (4)

(i) When it is judged that VoIP packet retransmission is necessary, (T2/Tf−Ct)−((T1−T2)/T2\*Ct) number of VoIP packets must be retroactively retransmitted using the wireless IP network 10B. At the switching server 100, VoIP packets previously transmitted within the window T1 are buffered. Among the (T2/Tf−Ct)−((T1−T2)/T2\*Ct) number of buffered VoIP packets, the switching server 100 must retroactively transmit the VoIP packets from the MN 300 via the wireless IP network 10B starting at the last VoIP packet.

(j) The number of VoIP packets to be transmitted within the window T1-window T2 using the wireless IP network 10B is calculated as (T1/Tf−Ct)\*T1/T2+(T2/Tf−Ct)−((T1−T2)/T2\*Ct). The number of VoIP packets calculated using this formula becomes the band to be complemented using the wireless IP network 10B. The switching server 100 transmits a complementary band quantity notification message (to be specific, the complementary band quantity notification message 2 shown in Table 2) including information indicating the calculated band (for example, the number of VoIP packets) to the MN 300. Additionally, in this case, the switching server 100 optimizes the size of the window T2 by reducing the same.

(3) Distribution of IP Packets

Next, a distribution method of IP packets (VoIP packets) to the wireless IP network 10A and the wireless IP network 10B will be described. Hereinafter, distribution of IP packets by the switching server 100 will be described as an example. Moreover, IP packets can be distributed by the MN 300 in the same manner as the switching server 100.

At the switching server 100, VoIP packets transmitted within the window T1 are buffered and temporarily stored. The VoIP packets are temporarily stored because there may be cases where band complementation requires retransmission of the VoIP packets via the wireless IP network 10B.

The switching server 100 transmits the VoIP packets at a predetermined period (20 ms) using the wireless IP network 10A. In addition, upon receiving a complementary band quantity notification message from the MN 300, the switching server 100 distributes the VoIP packets to the wireless IP network 10A and the wireless IP network 10B as described below.

(3.1) When Receiving the Complementary Band Quantity Notification Message 1

The complementary band quantity notification message 1 includes the number (NCOMP) of VoIP packets to be complemented by the wireless IP network 10B. The switching server 100 extracts exactly NCOMP number of VoIP packets from the tail of a transmission queue intended for the wireless IP network 10A. In addition, the switching server 100 adds the NCOMP number of extracted VoIP packets to a transmission queue intended for the wireless IP network 10B to be used for band complementation. The VoIP packets remaining in the transmission queue intended for the wireless IP network 10A are transmitted to the wireless IP network 10A.

(3.2) When Receiving the Complementary Band Quantity Notification Message 2

The complementary band quantity notification message 2 includes, in addition to NCOMP, the number (NreTx) of VoIP packets to be retransmitted by the wireless IP network 10B. The switching server 100 extracts exactly NreTx number of VoIP packets from the tail of the transmission queue intended for the wireless IP network 10A. In addition, the switching server 100 adds the NreTx number of extracted VoIP packets to the "top portion" of a transmission queue intended for the wireless IP network 10B to be used for band complementation.

Next, the switching server 100 extracts exactly NCOMP number of VoIP packets from the tail of a transmission queue intended for the wireless IP network 10A. Furthermore, the switching server 100 adds the NCOMP number of extracted VoIP packets to the "tail portion" of a transmission queue intended for the wireless IP network 10B to be used for band complementation.

(4) Variation of Judgment Time (Window T2) on Band Complementation

Next, a judgment time on band complementation or, in other words, methods of varying the size of the window T2 (refer to FIG. 6) will be described. To be specific, methods for varying the size of the window T2 will be described for: (1) when communication status is favorable; (2) when communication status is unfavorable; (3) a complete transition to the wireless IP network to be used for band complementation; and (4) when retransmitting VoIP packets.

Hereinafter, varying the size of the window T2 with the switching server 100 will be described as an example. Moreover, the size of the window T2 can be varied with the MN 300 in the same manner as the switching server 100. Additionally, in the following description, it is assumed that: Tf=20 ms; window T1=1,000 ms; and windows T3, T4 (tjit)=100 ms. Furthermore, the default value of the window T2 is assumed to be 500 ms.

(4.1) When Communication Status is Favorable

Figure 7:
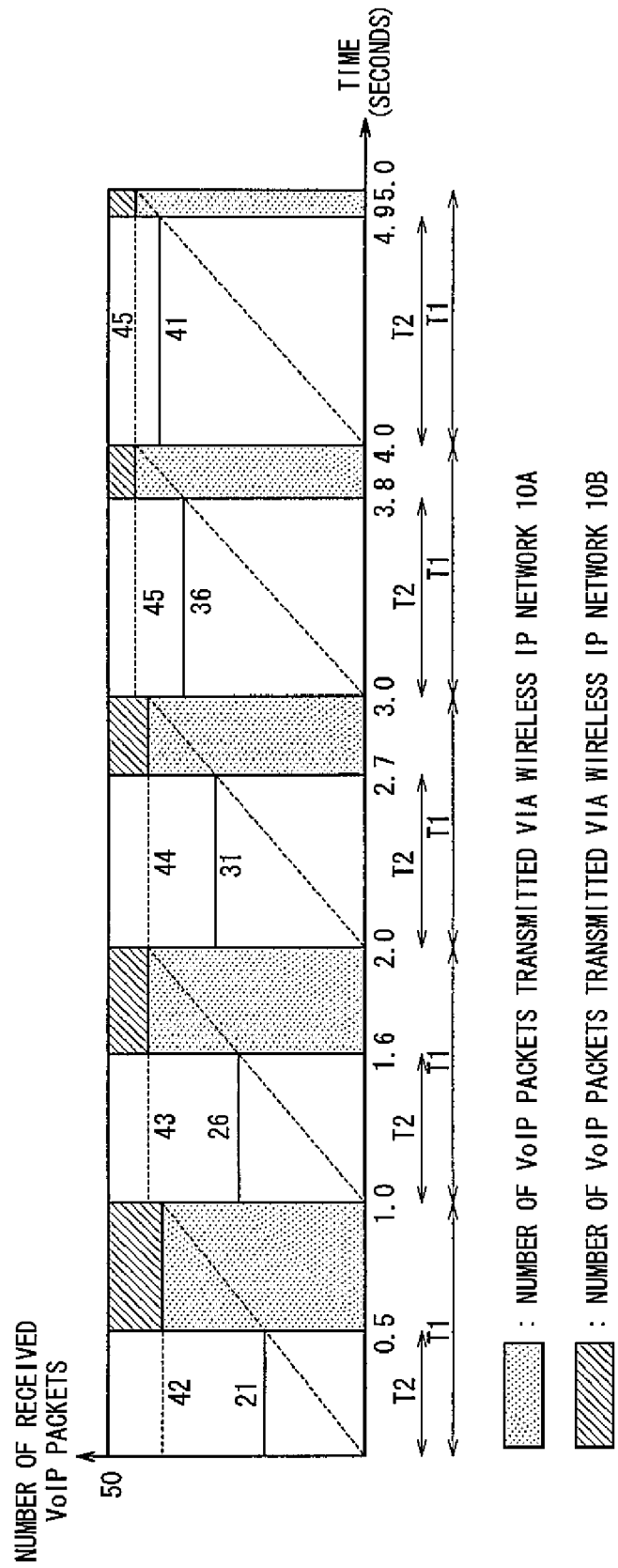
FIG. 7 is a diagram showing an example of resizing a window used in judging a complementary band according town embodiment of the present invention.

FIG. 7 shows how the size of the window T2 is varied depending on the number of VoIP packets received by the switching server 100 from the MN 300. In this case, it is assumed that the communication status between the switching server 100 and the MN 300 via the wireless IP network 10A is favorable.

As shown in FIG. 7, in the first window T2, the switching server 100 has received 21 VoIP packets. Therefore, the switching server 100 judges that 21 VoIP packets can be similarly received in the remaining window T1 (window T1-window T2).

Consequently, the switching server 100 computes a band (the number of VoIP packets) to be complemented within the window T1-window T2 using the wireless IP network 10B as follows.

T1/Tf-Ct*T1/T2=1000/20-21*1000/500=8 packets

Since Ct is 21, (Formula 2) presented above is satisfied. As a result, in the next window T1, the window T2 is set to 600 ms according to (Formula 3). Furthermore, since (Formula 2) is also satisfied in the next window T1 and the like, the size of the window T2 is expanded to 900 ms (upper limit).

On the other hand, the band to be complemented using the wireless IP network 10B has been sequentially reduced from 8 packets to 5 packets. When the size of the window T2 is 900 ms, Ct takes a value of 41. In other words, the switching server 100 computes a band to be complemented using the wireless IP network 10B as follows.

1000/20-41*1000/900=5 packets (decimals truncated)

(4.2) When Communication Status is Unfavorable

Figure 8:
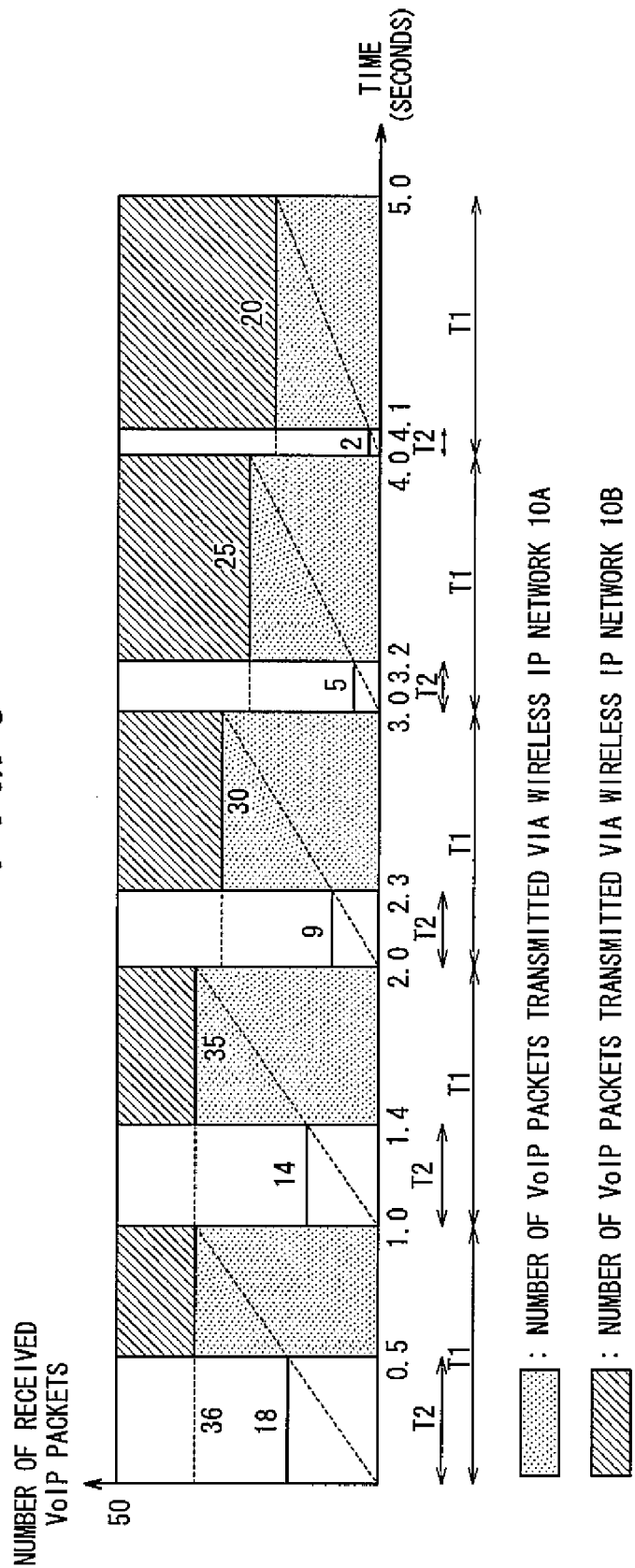
FIG. 8 is a diagram showing an example of resizing a window used in judging a complementary band according to an embodiment of the present invention.

In FIG. 8, it is assumed that the communication status between the switching server 100 and the MN 300 via the wireless IP network 10A is unfavorable. As shown in FIG. 8, since the communication status between the switching server 100 and the MN 300 via the wireless IP network 10A is unfavorable, the size of the window T2 is gradually reduced.

In the first window T2, the switching server 100 has received 18 VoIP packets. Consequently, the switching server 100 judges the band to be complemented within the window T1-window T2 using the wireless IP network 10B as 14 packets.

In addition, since Ct is 18, Formula (4) is satisfied while Formula (2) presented above is not. As a result, in the next window T1, the window T2 is set to 400 ms according to Formula (5). Furthermore, since Formula (4) is also satisfied in the next window T1 and the like, the size of the window T2 is reduced down to 100 ms (lower limit).

When the size of the window T2 becomes 100 ms, Ct takes a value of 2. In other words, the switching server 100 computes a band to be complemented using the wireless IP network 10B as follows.

1000/20-2*1000/100=30 packets (decimals truncated)

Figure 9:
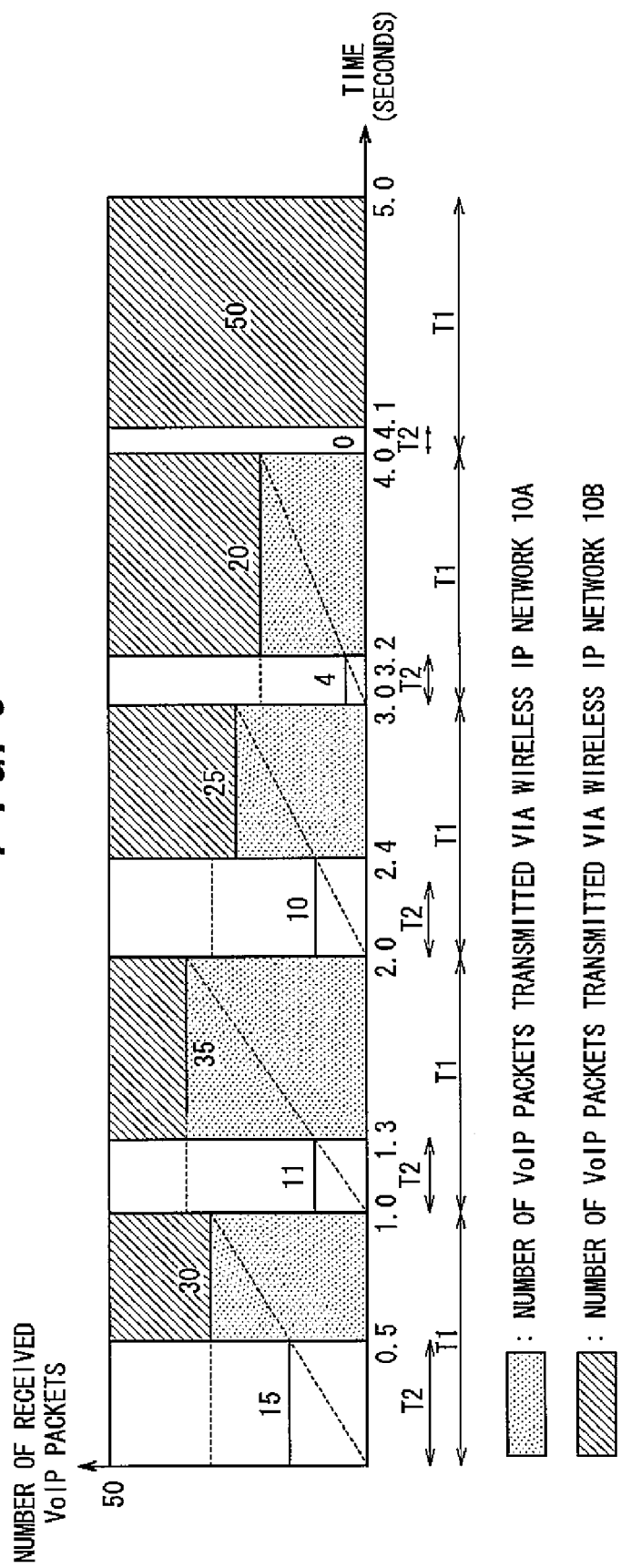
FIG. 9 is a diagram showing an example of resizing a window used in judging a complementary band according to an embodiment of the present invention.

(4.3) Complete Transition to Wireless IP Network to be Used for Band complementation FIG. 9 shows how the size of the window T2 is varied when the switching server 100 makes a complete transition (switch) from the wireless IP network 10A to the wireless IP network 10B to be used for band complementation.

As shown in FIG. 9, in the first window T2, the switching server 100 has received 15 VoIP packets. In this case, since k=1 does not satisfy Formulas (2) and (4), the value of k is incremented in Formula (6). Formula (4) is satisfied when k=2.

In other words, the switching server 100 judges that VoIP packets to be received in twice the jitter buffer time (100 ms) have not been received. As a result, the switching server 100 reduces the size of the window T2 to 300 ms according to Formula (5). Consequently, the switching server 100 computes the band to be complemented within the window T1-window T2 using the wireless IP network 10B as follows.

1000/20-15*1000/500=20 packets

In the next window T2 (300 ms), Ct takes a value of 11, thereby satisfying Formula (2). As a result, in the next window T1, the window T2 is set to 400 ms according to Formula (3).

Furthermore, in the next window T2 (400 ms), Ct takes a value of 10. In this case, since k=1 does not satisfy Formulas (2) and (4), the value of k is incremented in Formula (6). Formula (4) is satisfied when k=2. As a result, the switching server 100 reduces the size of the window T2 to 200 ms according to Formula (5).

Moreover, in the next window T2 (200 ms), Ct takes a value of 4. In this case, Formula (4) is satisfied while Formula (2) is not. As a result, the switching server 100 reduces the size of the window T2 to 100 ms according to Formula (5). In this case, the switching server 100 computes a band (the number of VoIP packets) to be complemented within the window T1-window T2 using the wireless IP network 10B as follows.

1000/20-4*1000/200=30 packets

Furthermore, in the next window T2 (100 ms), Ct takes a value of 0, signifying that the entire band is to be complemented using the wireless IP network 10B. In other words, the communication path between the switching server 100 and the MN 300 is completely switched over from the wireless IP network 10A to the wireless IP network 10B.

(4.4) Retransmission of VoIP Packets

Figure 10:
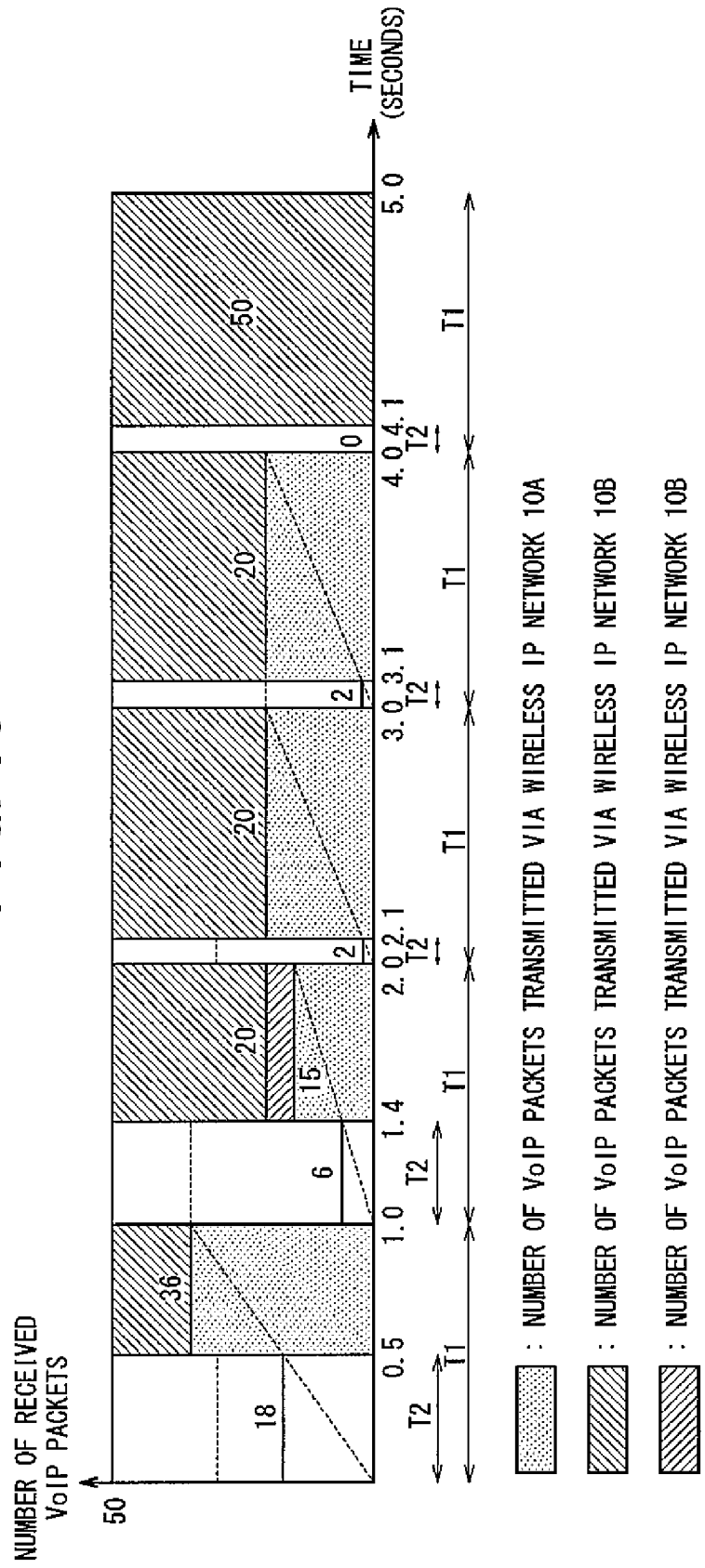
FIG. 10 is a diagram showing an example of resizing a window used in judging a complementary band according to an embodiment of the present invention.

FIG. 10 shows how the size of the window T2 is varied when the switching server 100 retransmits, using the wireless IP network 10B, VoIP packets transmitted using the wireless IP network 10A.

As shown in FIG. 10, in the first window T2, the switching server 100 has received 18 VoIP packets. In this case, Formula (4) is satisfied while Formula (2) is not. As a result, the switching server 100 reduces the size of the window T2 to 400 ms according to Formula (5). In addition, the switching server 100 judges the band to be complemented within the window T1-window T2 using the wireless IP network 10B as 14 packets.

In the next window T2 (400 ms), Ct takes a value of 6, thereby not satisfying Formula (1). Consequently, it is judged that VoIP packets already transmitted using the wireless IP network 10A must be retransmitted using the wireless IP network 10B. Since Ct takes a value of 6 in the window T2 (400 ms), the number of VoIP packets transmittable to the window T1 using the wireless IP network 10A is calculated as 15 packets (=6*1000/400).

In window T2 (400 ms), 20 (=400/20) VoIP packets have already been transmitted using the wireless IP network 10A. This means that among the VoIP packets, 5 VoIP packets will fail to arrive within the window T1. Therefore, the switching server 100 retransmits the 5 VoIP packets using the wireless IP network 10B. Furthermore, the switching server 100 transmits 30 VoIP packets using the wireless IP network 10B.

According to the switching server 100, when the size of the band of the wireless IP network 10A used for receiving VoIP packets from the MN 300 is insufficient for transferring the VoIP packets within the window T1, a complementary band quantity notification message (first upbound transmission control information) that causes the wireless IP network 10A to transmit the number of VoIP packets transmittable using the band within the window T1-window T2 is transmitted to the MN 300.

In addition, a complementary band quantity notification message (second upbound transmission control information) that causes the wireless IP network 10B to transmit the remaining VoIP packets excluding those transmittable using the wireless IP network 10A within the window T1-window T2 is transmitted to the MN 300.

Consequently, a plurality of wireless IP networks can be utilized at the same time, and when a band of a wireless IP network being used by a communication being executed is insufficient, the insufficient band can be complemented with another wireless IP network. In other words, instead of simply switching wireless IP networks, a plurality of wireless IP networks can be used "seamlessly".

In addition, since the care-of address A1 assigned to the MN 300 in the wireless IP network 10A and the care-of address A2 assigned in the wireless IP network 10B are associated with the home IP address AH at the MN 300, the MN 300 is capable of executing communication using a plurality of care-of addresses simultaneously.

Furthermore, according to the switching server 100, VoIP packets are distributed to the wireless IP network 10A and the wireless IP network 10B based on a complementary band quantity notification message (first downbound transmission control information and second downbound transmission control information) received from the MN 300. Consequently, the switching server 100 is capable of reliably transmitting VoIP packets to the MN 300 while complementing an insufficient band of the wireless IP network 10A using the wireless IP network 10B.

Moreover, while the switching server 100 executes monitoring of the status of upbound communication (delay time) and distribution of downbound VoIP packets as described above, the MN 300 executes monitoring of the status of downbound communication (delay time) and distribution of upbound VoIP packets using the same methods as the switching server 100. In other words, according to the communication system 1 including the switching server 100 and the MN 300, in both upbound and downbound directions, a plurality of wireless IP networks can be utilized at the same time, and when a band of a wireless IP network being used by a communication being executed is insufficient, the insufficient band can be complemented using another wireless IP network.

Furthermore, according to the switching server 100 and the MN 300, since the size of the window T2 can be adaptively varied depending on the number of VoIP packets already received, a band to be complemented using the wireless IP network 10B can be computed with even greater accuracy.

Next, operations of the delay computing unit 107B, the band calculating unit 107C, the displacement calculating unit 107D, and the transmission band determining unit 107E will be described in detail. FIG. 11($a$) is a diagram showing a time variation in a sequence number of an IP packet in the first wireless network (path A) and the second wireless network (path B) in a case where communication control according to the present invention is not performed, while FIG. 11($b$) is a diagram showing a time variation in a sequence number of an IP packet in the first wireless network (path A) and the second wireless network (path B) in a case where communication control according to the present invention is performed. In FIGS. 11($a$) and 11($b$), sequence numbers SN are plotted as the ordinates and time T as the abscissas. In addition, a time variation of the sequence number of an IP packet in the first wireless network (path A) is depicted by the bold solid line, while a time variation of the sequence number of an IP packet in the second wireless network (path B) is depicted by the bold dashed line.

In FIGS. 11($a$) and 11($b$), by transmitting IP packets to be transmitted excluding those transmittable via the first wireless network (path A) within periods t0 to t3 via the second wireless network (path B), band complementation is performed using the path B.

A delay difference Dc(t) calculated from a difference in reception Sn of the path A and the path B may be expressed as $$Dc(t) = (|SNa(n) - SNb(m)| - 1) \times Tunit \quad (7), \text{where}$$

SNa(n): sequence number of IP packet arrived nth in path A

SNb(m): sequence number of IP packet arrived mth in path B, and

Tunit: unit time.

When VoIP is assumed as the application, transmitting one packet at intervals of, for example, a 0.02 second-unit time Tunit results in an application-requested band (Papr) of 50 (packet/seconds) (the application-requested band (Papr) becomes equal to a displacement Sapr of sequence numbers SN of the application).

If an nth IP packet is received at time t, then a permissible band Pa(t) of the path A may be expressed as $$Pa(t) = \{n - (n - \Delta n)\} / \{T(n) - T(n - \Delta n)\} \quad (8), \text{where}$$

T(n): arrival time of nth arriving IP packet.

When the permissible band Pa(t) is smaller than the application-requested band Papr, IP packets that could not be transmitted via the path A are transmitted via the path B.

While plots of the sequence numbers SN of the path A appear the same in periods t0 to t3 as well as in other periods, plot densities differ. In other words, the plot densities of the periods t0 to t3 decrease in comparison with other periods.

In the event that IP packets corresponding to the complementary band is transmitted to the path B when a permissible band in the path B is insufficient with respect to a band for which complementation is requested, the band deficiency causes the IP packets to be temporarily stored in a buffer existing on the path B and sequentially transmitted. As a result, a delay difference Dc is created between IP packets received via the path A and IP packets received via the path B. In real-time applications such as VoIP, the delay difference Dc is manifested as an overtaking of sequence numbers.

In a real-time application, a jitter buffer exists so as to absorb overtaking of IP packets within a network. IP packets delayed beyond the capacity of the jitter buffer due to an increase in the delay difference Dc are discarded at the receiving side. When IP packets exceeding the permissible band are continuously transmitted, the amount of IP packets accumulated in the buffer existing on the path B increases until reaching the buffer limit and becomes a delay difference Dc in accordance with the accumulated amount, and all IP packets transmitted for complementation are eventually discarded at the receiving side. In particular, since a wireless path is dependent on variations in propagation environment, when complementation equal to or exceeding the varying permissible band is performed in an unfavorable wireless propagation environment, a delay difference Dc exceeding the permissible amount is created.

In the present embodiment, as will be described later, by determining a band (complementary band) of the second wireless IP network so that the delay difference Dc falls within a permissible delay difference Dp, the risk of transmitted IP packets being discarded at the receiving side can be reduced. Moreover, the permissible delay difference Dp is calculated based on a potential delay (for example, an average delay) contained in the application as well as paths A and B, and in the case of VoIP, is calculated as, for example, 200 ms.

Figure 12:
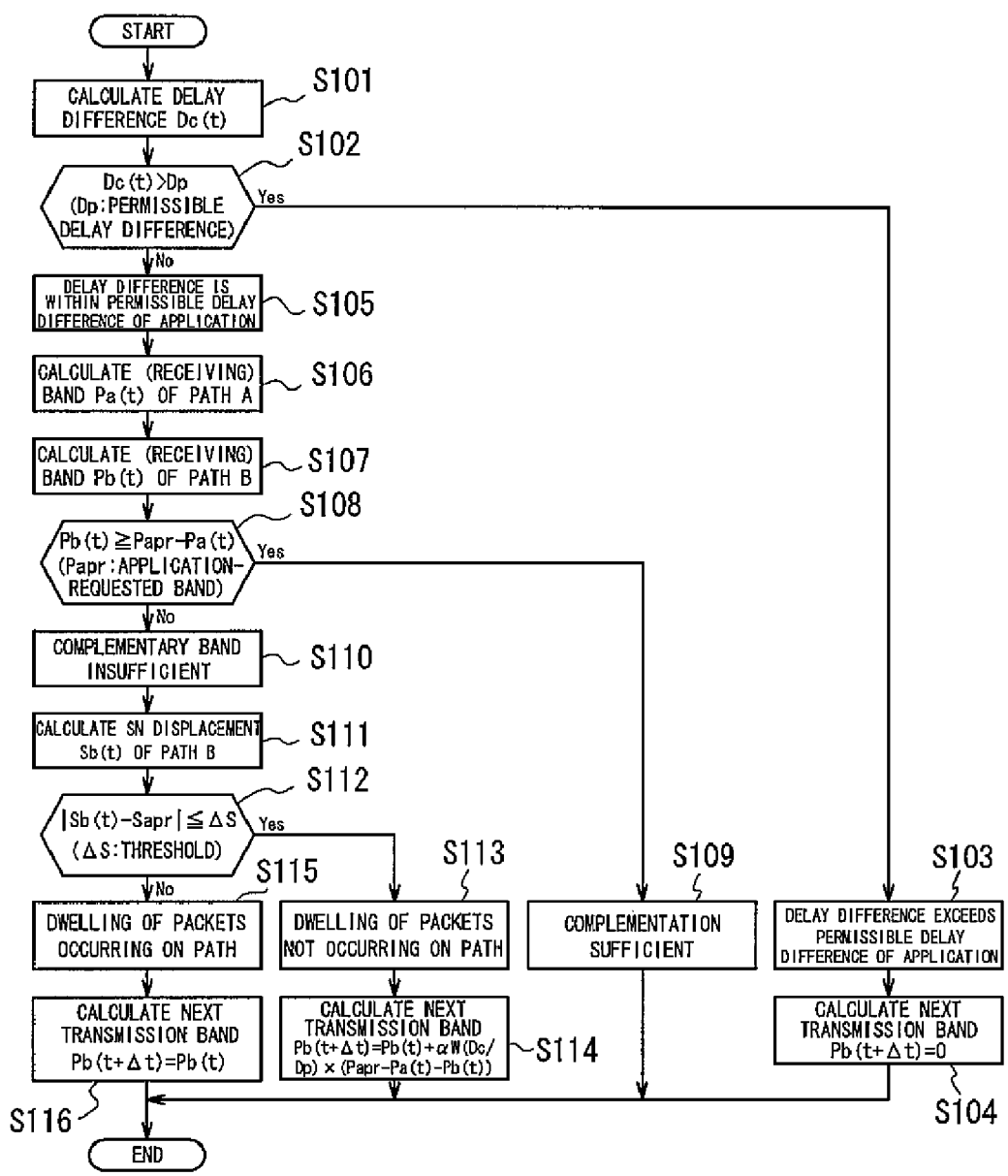
FIG. 12 is a flowchart for calculating a band to be transmitted next according to an embodiment of the present invention.

FIG. 12 is a flowchart for calculating a band to be transmitted next according to an embodiment of the present invention. In the present routine, a delay difference Dc(t) is calculated (step S101), and a judgment is made on whether the delay difference Dc(t) is greater than a permissible delay difference Dp or not (step S102). When the delay difference Dc(t) is greater than the permissible delay difference Dp, it is determined that a delay difference Dc is exceeding an permissible delay difference of the application (step S103), and in order to eliminate the delay difference or, in other words, reduce a complementary band, a presumed band Pb(t+Δt) of path B at time t+Δt (in the case where an insufficient band in path A does not vary) is set to 0 (step S104), thereby ending the present routine.

When the delay difference Dc(t) is equal to or smaller than the permissible delay difference Dp, it is determined that the delay difference Dc is within the permissible delay difference of the application (step S105), and a permissible band Pa(t) of the path A is calculated according to Formula (8) (step S106). At the same time, a (receiving) band Pb(t) of the path B having received an mth IP packet at time t is calculated (step S107) according to $$Pb(t)=\{m-(m-\Delta m)\}/\{T(m)-T(m-\Delta m)\} \quad (9), \text{where}$$

T(m): arrival time of mth arriving IP packet.
The (receiving) band Pb(t) of the path B is a band obtained by a reception at time t and differs from a corresponding transmitting band of the transmitting side.

Subsequently, a judgment is made on whether Pb(t)≧Papr−Pa(t) or not (step S108). When Pb(t)≧Papr÷Pa(t), complementation is judged as being sufficient (step S109) and the present routine is concluded. In contrast, when Pb(t)<Papr−Pa(t), complementation is judged as being insufficient (step S110) and a sequence number (SN) displacement Sb(t) of the path B at time t is calculated (step S111) according to $$Sb(t)=\{SNb(m)-SNb(m-\Delta m)\}/\{T(m)-T(m-\Delta m)\} \quad (10), \text{where}$$

SNb(m): sequence number of mth arriving IP packet.
Subsequently, a judgment is made on whether |Sb(t)−Sapr|≦ΔS (ΔS: threshold) or not (step S112). If |Sb(t)−Sapr|≦ΔS, it is determined that dwelling of IP packets on the path B has not occurred and the complementary band can be increased (step S113), and a presumed band Pb(t+Δt) is calculated (step S114) according to $$Pb(t+\Delta t)=Pb(t)+\alpha W(Dc/Dp)\times(Papr-Pa(t)-Pb(t)) \quad (11), \text{where}$$

W(Dc/Dp): weighting ratio,
thereby concluding the present routine.

If |Sb(t)−Sapr|>ΔS, it is determined that dwelling of IP packets on the path B has occurred and the complementary band must be reduced (step S115), whereby the presumed band Pb(t+Δt) is set to Pb(t) (step S116) and the present routine is concluded. By correcting the complementary band according to the present routine, a characteristic such as that shown in FIG. 11(b) can be obtained. Consequently, as is apparent from FIG. 11(b), a plurality of wireless IP networks can be utilized at the same time, and when a band of a wireless IP network being used by a communication being executed is insufficient, the insufficient band can be favorably complemented with another wireless IP network. A transmission ratio based on the presumed band (of the paths A and B) calculated in the present routine is transmitted to the transmitting side of the IP packets.

Figure 13:
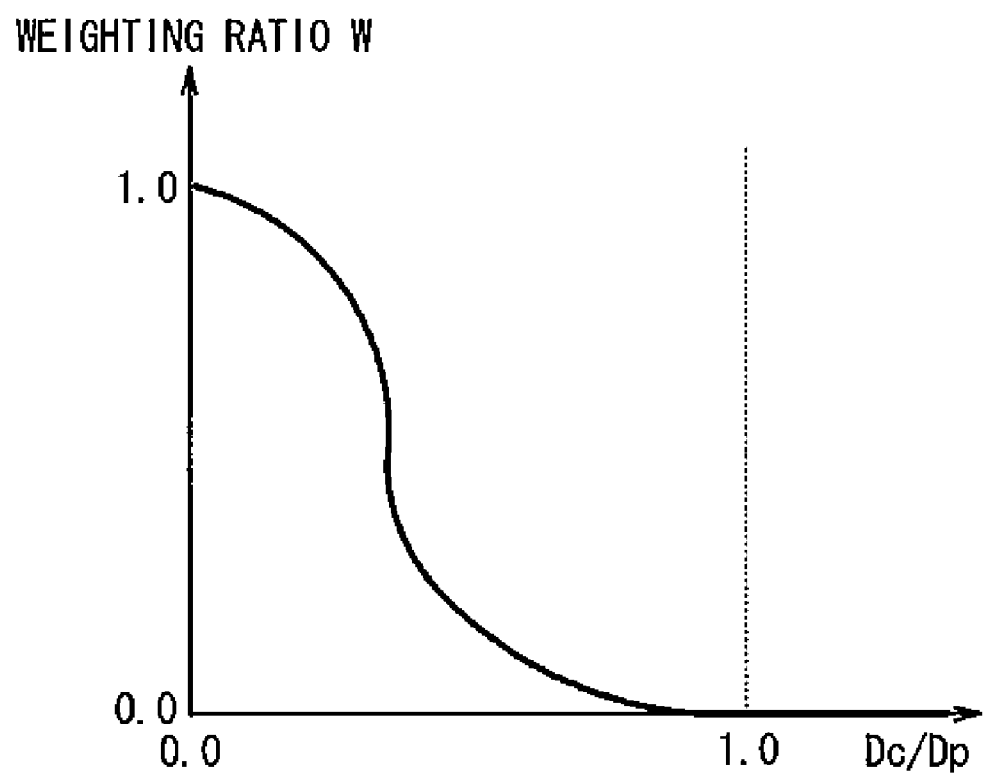
FIG. 13 is a graph showing a relationship between weighting ratio W and delay difference Dc/permissible delay difference Dp.

FIG. 13 is a graph showing a relationship between a weighting ratio W and delay difference De/permissible delay difference Dp. When it is determined in step S113 shown in FIG. 12 that the complementary band of the path B can be increased, an increase in complementary band is adjusted using the weighting ration W. The weighting ration W may be expressed as $$W(x)=\{\cos(\pi x)+1\}/2 (0 \leq x \leq 1) \quad 12$$

$$W(x)=0 (x>1) \quad 13.$$

Therefore, the weighting ration W approaches 0 as the delay difference Dc(t) approaches the permissible delay difference Dp. Accordingly, the delay difference Dc is prevented from taking a significantly large value.

When the wireless status from a wireless communication device can be measured, a coefficient α expressed as $$\alpha(Rssi(t))=[0,1] \quad (14)$$

is used to set a weighting ratio W in accordance with reception strength. For example, in an environment where the reception strength is favorable, α is approximated to 1 to promote an increase in the complementary band of the path B at a next point in time. In contrast, in an environment where the reception strength is unfavorable, α is approximated to 0 to suppress an increase in the complementary band of the path B at a next point in time.

When a wireless environment cannot be acquired in the same manner as with the switching server 100, the value of α is fixed to, for example, 0.5. Consequently, even when there is no information regarding the wireless status or the like, dwelling of IP packets on the path B can be judged and the number of IP packets received and discarded by the MN 300 can be reduced.

The present invention is not limited to the embodiment described above, and various changes and modifications may be made.

For example, while the communication system 1 has been arranged so as to include the wireless IP network 10A and the wireless IP network 10B, the number of wireless IP networks used can be further increased.

In addition, while the embodiment described above has been arranged so that the size of the window T2 is adaptively varied, the size of the window T2 may instead be fixed at a predetermined size (for example, 500 ms). Furthermore, while the embodiment described above has been arranged so that insufficient bands are complemented in both upbound and downbound directions, an alternative embodiment is also possible in which only an upbound band or a downbound band is complemented. In addition, for example, the aforementioned wireless communication card 301 (or wireless communication card 303) may be replaced with a wireless unit built into the wireless communication apparatus.

The present application is a national stage of International Application No. PCT/JP2007/068875 (filed on Sep. 27, 2007), and claims the benefit of priority from Japanese Patent Application No. 2006-265089 (filed on Sep. 28, 2006), the entire contents of which are incorporated herein by reference.

The invention claimed is:
1. A communication control apparatus capable of utilizing a communication path and a complementary path, comprising:
   a displacement calculating unit that, in response to a case that a receiving band of the complementary path is insufficient with respect to a requested band by an application, calculates a displacement of a sequence number of an IP packet in the complementary path; and
   a transmission band determining unit that judges, based on the displacement, whether or not the IP packet is dwell- ing in the complementary path, and determines a transmission band in the complementary path based on the judgment.

2. The communication control apparatus according to claim 1, comprising:
a delay difference calculating unit that calculates a delay difference between a delay of an IP packet arriving via the communication path and a delay of an IP packet arriving via the complementary path,
wherein if the delay difference exceeds a permissible delay difference, the transmission band of the complementary path is set to zero.

3. The communication control apparatus according to claim 1, comprising:
a delay difference calculating unit that calculates a delay difference between a delay of an IP packet arriving via the communication path and a delay of an IP packet arriving via the complementary path,
wherein if the delay difference is within a permissible delay difference, and dwelling of an IP packet has not occurred in the complementary path, the transmission band determining unit increases the transmission band with a receiving band in the complementary path and the receiving band in the communication path.

4. The communication control apparatus according to claim 1, comprising:
a delay difference calculating unit that calculates a delay difference between a delay of an IP packet arriving via the communication path and a delay of an IP packet arriving via the complementary path,
wherein if the delay difference is within a permissible delay difference, and dwelling of an IP packet has occurred in the complementary path, the transmission band determining unit reduces the transmission band with a receiving band in the complementary path.

5. A communication control method capable of utilizing a communication path and a complementary path, comprising the steps of:
calculating by a displacement calculating unit, in response to a case that a receiving band of the complementary path is insufficient with respect to a requested band by an application, a displacement of a sequence number of an IP packet in the complementary path; and
judging, by a transmission band determining unit, based on the displacement, whether or not the IP packet is dwelling in the complementary path, and determining a transmission band in the complementary path based on the judgment.

6. The communication control method according to claim 5, comprising:
calculating by a delay difference calculating unit a delay difference between a delay of an IP packet arriving via the communication path and a delay of an IP packet arriving via the complementary path,
wherein if the delay difference exceeds a permissible delay difference, the transmission band of the complementary path is set to zero.

7. The communication control method according to claim 5, comprising:
calculating by a delay difference calculating unit a delay difference between a delay of an IP packet arriving via the communication path and a delay of an IP packet arriving via the complementary path,
wherein if the delay difference is within a permissible delay difference, and dwelling of an IP packet has not occurred in the complementary path, increasing the transmission band with a receiving band in the complementary path and the receiving band in the communication path.

8. The communication control method according to claim 5, comprising:
calculating by a delay difference calculating unit a delay difference between a delay of an IP packet arriving via the communication path and a delay of an IP packet arriving via the complementary path,
wherein if the delay difference is within a permissible delay difference, and dwelling of an IP packet has occurred in the complementary path, reducing the transmission band with a receiving band in the complementary path.

* * * * *